P. E. WALDVOGEL.
DRAFT APPLIANCE.
APPLICATION FILED MAR. 5, 1912.
1,027,677.
Patented May 28, 1912.
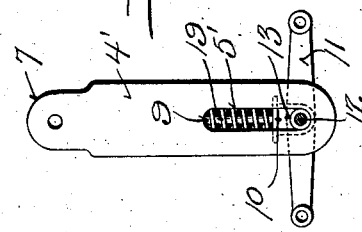
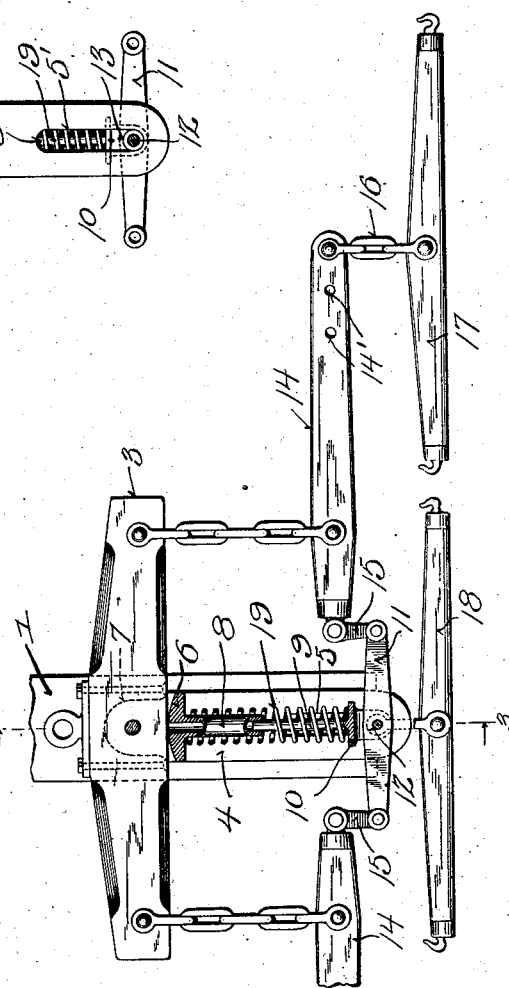
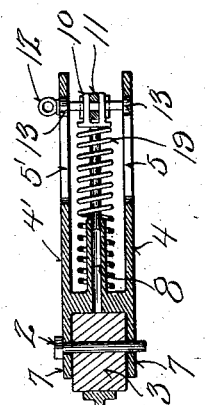

UNITED STATES PATENT OFFICE.

PAUL E. WALDVOGEL, OF MILWAUKEE, WISCONSIN, ASSIGNOR TO MALLERY MANUFACTURING COMPANY, OF SOUTH MILWAUKEE, WISCONSIN, A CORPORATION OF WISCONSIN.

DRAFT APPLIANCE.

1,027,677. Specification of Letters Patent. Patented May 28, 1912.

Application filed March 5, 1912. Serial No. 681,748.

*To all whom it may concern:*

Be it known that I, PAUL E. WALDVOGEL, a citizen of the United States, and resident of Milwaukee, in the county of Milwaukee and State of Wisconsin, have invented certain new and useful Improvements in Draft Appliances; and I do hereby declare that the following is a full, clear, and exact description thereof.

My invention refers to spring-controlled draft appliances for double or three-horse teams, its object being to provide a simple, economical and effective yielding connection between the load and draft animals whereby dead strain upon said animals is relieved due to the cushion effect.

In a general way my invention contemplates the attachment of a spring-carrying bracket to a double-tree, the attachment being effected by utilizing the standard swivel-bolt of the double-tree, whereby the bracket and said double-tree are rendered independently oscillatory about the bolt. Opposed to the bracket spring is a pivotally mounted floating lever, the pivot-bolt of which lever is also mounted in guide-slots of the bracket, whereby the floating lever is permitted to move bodily in opposition to the spring and is also rendered oscillatory. Draft arms are linked to the ends of the floating lever and to the double-tree, the outer ends of the draft arms being arranged to receive swingle-trees as shown, it being understood that the draft rigging may be utilized for a three-horse evener by connecting a swingle-tree to the fulcrum point of the floating lever, said double-tree being thus alined with and disposed intermediate of the draft arm double-tree.

With the above object in view the invention consists in what is herein shown and described with reference to the accompanying drawings and subsequently claimed.

In the drawings Figure 1 represents a fragmentary plan view of a draft rigging embodying the features of my invention, with parts broken away and in section to more clearly illustrate structural features; Fig. 2, a detailed plan view of the spring-carrying oscillatory bracket, the same being shown with a floating lever attachment, and Fig. 3, a longitudinal sectional view of the draft rigging, the section being indicated by line 3—3 of Fig. 1.

Referring by characters to the drawings, 1 represents a draft member provided with a draft-bolt 2, which draft-bolt forms the ordinary swivel-connection of a double-tree 3. Secured to the draft-bolt and double-tree is a spring-carrying bracket, the same comprising upper and lower arms 4, 4', which arms are provided with longitudinal slots 5, 5', as shown. The rear ends of the arms are connected by head 6 from which extend apertured ears 7, 7, that overlap the double-tree, their apertures being provided for engagement with the draft-bolt 2. Thus it will be seen that the bracket has independent oscillatory movement relative to the movement of the double-tree, said movement being permitted by the inner surface of the head 6 being convexed. The head 6 is provided with a forwardly extended hollow shank 8 into which is fitted a plunger-rod 9, the same being provided with a forked head 10 for the reception of a floating lever 11. The floating lever together with the forked head is provided with apertures for the reception of a swivel-bolt 12 whereby said floating lever is retained. The swivel-bolt is also provided with antifriction collars 13 that engage the upper and lower surfaces of the floating lever and are adapted to have sliding engagement with the walls of the bracket slots 5, 5'.

Linked to the ends of the double-tree are draft arms 14, their inner ends being connected to the floating lever by links 15. The outer ends of these draft arms are provided with a series of apertures 14' for the reception of links 16, which links carry the usual swingle-trees 17.

As shown in Fig. 1 of the drawings the draft apparatus is arranged and spaced for connecting an intermediate swingle-tree 18 whereby the said device is employed as a three-horse evener, the swingle-tree 18 being linked to the swivel-bolt 12 of the floating-lever. Should it be desired to utilize the device as a two-horse draft appliance it is apparent that the flanking swingle-tree 17 may be attached to one of the inner apertures 14' of the draft arms, whereby said swingle-trees will be brought in their proper relative position for a two horse team.

Interposed between the plunger-rod head 10 and head 6 of the bracket is a coiled spring 19, which coiled spring surrounds the plunger-rod and shank 8, the ends of said spring being engaged respectively with the plunger-rod head and head 6 of said bracket.

From the foregoing description it will be readily understood that when the device is used as a two-horse draft rigging, power being applied to the draft arms equally will cause the floating lever to move straight backward under the spring pressure without oscillating upon its pivot post, but should the power be applied unequally the lever 10 will float backward and cant upon its pivot bolt, and owing to the fact that the bracket is independently fulcrumed relative to the double-tree said bracket will always maintain alinement with the draft member 1 irrespective of any oscillatory movement of the double-tree and draft arms. Thus the load will be evenly distributed and shock upon the draft animals eliminated to a maximum degree.

When the draft appliance is used as a three-horse evener it is apparent that the center draft animal will not pull against the spring pressure but with the same, while the flanking animals will oppose the draft of the intermediate animal and will work in opposition to said spring pressure.

I claim:

1. A draft rigging comprising a draft member, a double-tree secured thereto, a draft bracket secured to the double-tree having longitudinally slotted arms, a floating lever interposed between the bracket arms, a pivot-bolt for the floating lever in slidable engagement with the bracket slots, a spring in opposition to the floating lever for resisting load strain, a draft arm in link connection with each end of the double-tree, a link connection between the inner ends of the draft arms and ends of the floating lever, and a swingle-tree connected to the outer end of each draft arm.

2. A draft rigging comprising a draft member, a draft-bolt carried thereby, a double-tree mounted upon the draft-bolt, a draft bracket having ears overlapping the double-tree in pivotal engagement with the draft-bolt, slotted arms extending from the bracket ears, a head connecting the arms and bracket ears, a floating lever interposed between the bracket arms, a pivot-bolt for the floating lever in slidable engagement with the bracket-slots, a spring interposed between the floating lever and bracket head arranged to resist strain load, a draft arm in link connection with each end of the double-tree, links connecting the inner ends of the draft arms with the ends of the floating lever, and a swingle-tree connected to the outer end of each draft arm.

3. A draft rigging comprising a draft member, a double-tree secured thereto, a draft bracket secured to the double-tree, the draft bracket being provided with longitudinal slotted arms, a floating lever interposed between the bracket arms, a pivot-bolt for the floating lever in slidable engagement with the bracket-slots, a spring in opposition to the floating lever for resisting load strain, a draft arm in link connection with each end of the double-tree, links connecting the inner ends of the draft arms with the ends of the floating lever, a swingle-tree in connection with the floating lever pivot-bolt, and a swingle-tree in link connection with the outer end of each draft arm.

In testimony that I claim the foregoing I have hereunto set my hand at Milwaukee in the county of Milwaukee and State of Wisconsin in the presence of two witnesses.

PAUL E. WALDVOGEL.

Witnesses:
GEO. W. YOUNG,
M. E. DOWNEY.

Copies of this patent may be obtained for five cents each, by addressing the "Commissioner of Patents, Washington, D. C."